United States Patent [19]

Oka

[11] Patent Number: 5,408,210
[45] Date of Patent: Apr. 18, 1995

[54] ELECTRONIC CASH REGISTER WITH CUSTOMER LINE LENGTH INDICATION

[75] Inventor: Yukihiko Oka, Yamatokoriyama, Japan

[73] Assignee: Sharp Kabushiki Kaisha, Osaka, Japan

[21] Appl. No.: 98,902

[22] Filed: Jul. 29, 1993

[30] Foreign Application Priority Data

Jul. 29, 1992 [JP] Japan .................................. 4-202279

[51] Int. Cl.6 ........................... G08B 7/06; G08B 5/36
[52] U.S. Cl. .................. 340/286.06; 340/573; 364/405; 235/383
[58] Field of Search ............... 340/540, 573, , 286.06; 364/401, 404, 405, ; 235/383

[56] References Cited

U.S. PATENT DOCUMENTS

| | | | |
|---|---|---|---|
| 3,803,578 | 4/1974 | La Vanway | 340/286.06 |
| 3,893,094 | 7/1975 | Thorson et al. | 340/286.06 |
| 3,921,160 | 11/1975 | Ratner | 340/541 |
| 4,700,295 | 10/1987 | Katsof et al. | 364/401 |

FOREIGN PATENT DOCUMENTS

| | | |
|---|---|---|
| 298797 | 4/1990 | Japan . |
| 4241700 | 8/1992 | Japan . |
| 2162349 | 1/1986 | United Kingdom | 340/573 |
| 8202972 | 9/1982 | WIPO | 364/401 |

Primary Examiner—John Shepperd

[57] ABSTRACT

Smooth transaction at an ECR is facilitated. An ECR includes a customer number counter and a lamp which are connected to each other by a signal line hence which are controllable by a CPU. In a RAM of the ECR, memories and a total customer number memory are disposed. In the memory, a predetermined value which serves as a reference for judging the crowdedness of the ECR is set. A difference between a value which is obtained at the memory by adding up and storing the sum of the numbers of customers waiting in front of the ECR which are read from the customer number counter and a value which is obtained at the total customer number memory in which values obtained at the memory which stores the number of customers for one transaction are serially added up and stored is compared with a value which is obtained at the memory. If the difference is smaller than the value at the memory, the CPU determines that the ECR is not crowded and turns on the lamp. If the difference is larger than the value at the memory, the CPU determines that the ECR is crowded and turns off the lamp.

9 Claims, 5 Drawing Sheets

Fig. 3

ELECTRONIC CASH REGISTER WITH CUSTOMER LINE LENGTH INDICATION

BACKGROUND OF THE INVENTION

1. Field of the Invention

The present invention relates to an electronic cash register which is located in various stores to register sales information, such as a sales total of goods.

2. Description of Related Art

In a large scale store, such as a department store or a supermarket, a plurality of electronic cash registers (hereinafter "ECR") are located. The prices and the numbers of goods a customer has bought are entered through a keyboard in each ECR, and the ECR displays and registers sales data. After registration of all goods the customer has bought is complete, the ECR performs finalizing and issues a receipt so that the customer pays the charges of the goods. In this manner, one registration procedure is completed.

In choosing one of the ECRs to pay the price of the goods to buy, a customer checks the number of other customers who are waiting in front of check out lanes, (i.e., table counters), which are located in the vicinity of the respective ECRs in order to look for the ECR with the smallest number of customers waiting for payment, and pays the prices of the goods he or she wants to buy.

Customarily, to judge which ECR has the minimum number of customers waiting to pay the prices, a customer observes visually the number of customers waiting in front of each ECR and compares the numbers of the customers in each line. Hence, from a distance, it is difficult to compare the number of customers at all the ECRs and find an ECR with the least customers waiting.

SUMMARY OF THE INVENTION

An object of the invention is to offer an ECR which is capable of judging how crowded it is with customers who are waiting for transaction of purchased items and of informing the crowdedness.

The invention is directed to an ECR which is characterized by comprising means for informing a predetermined information to customers who are waiting for transaction; means for detecting the number of customers who are waiting for transaction; and means for controlling to drive the informing means when the number of customers detected by the detecting means exceeds a predetermined reference value.

The invention is also characterized in that the informing means is a display apparatus.

The invention is also characterized in that the informing means is a lamp.

In addition, the invention is characterized in that the detecting means comprises: a customer number counter for counting the number of customers who are waiting for transaction; a first memory for storing a count of the customer number counter; an enter key for registering the number of customers for each transaction; a second memory for storing a registered customer number which is registered by the entry key; means for calculating to accumulate counts of the second memory for every entry into the second memory using the entry key; and a total customer number memory for storing an accumulated count which is calculated by the calculating means, and the detecting means detects a difference between the count which is stored in the first memory and the count which is stored in the total customer number memory.

Further, the invention is characterized in that the controlling means outputs a signal which indicates that the number of the customers detected by the detecting means exceeds the predetermined reference value and a signal which represents the number of the customers detected by the detecting means in order to drive the informing means.

According to the invention, the ECR comprises: the informing means; the detecting means for detecting the number of customers who are waiting for transaction; and the controlling means for driving the informing means. The detecting means calculates a difference between the total number of customers who are waiting in front of the ECR (if a plurality of ECRs are disposed, the total number of customers who are waiting in front of all ECRs) and the total number of customers who has finished transaction, for example, to thereby detect the number of the customers who are waiting for transaction. When the number of the customers detected by the detecting means exceeds the predetermined reference value, the informing means is driven by the controlling means.

Hence, by observing the activation state of the informing means, it is possible to judge the crowdedness of the ECR with customers who are waiting for transaction. If a plurality of ECRs are disposed, in accordance with the activation states of the informing means, a customer can choose one of the ECRs with the smallest number of customers waiting for transaction. This allows that the ECRs operate effectively and transaction is performed smoothly.

As heretofore described, according to the invention, the informing means is driven if there are a large number of customers waiting for transaction but is not driven if there are a small number of customers waiting for transaction, whereby the crowdedness of the ECR with customers who are waiting for transaction is informed. Hence, where a plurality of ECRs are disposed and a customer determines the least crowded ECR and waits in front of that ECR for transaction, there will be no extremely crowded ECR or extremely less crowded ECR, and therefore, all ECRs will operate efficiently. This benefits customers as well since the time they have to wait for transaction is reduced and transaction is performed smoothly.

BRIEF DESCRIPTION OF THE DRAWINGS

Other and further objects, features, and advantages of the invention will be more explicit from the following detailed description taken with reference to the drawings wherein:

FIG. 3 is a plan view showing a keyboard 3 of the ECR 1;

DETAILED DESCRIPTION OF THE PREFERRED EMBODIMENTS

Figure 1:
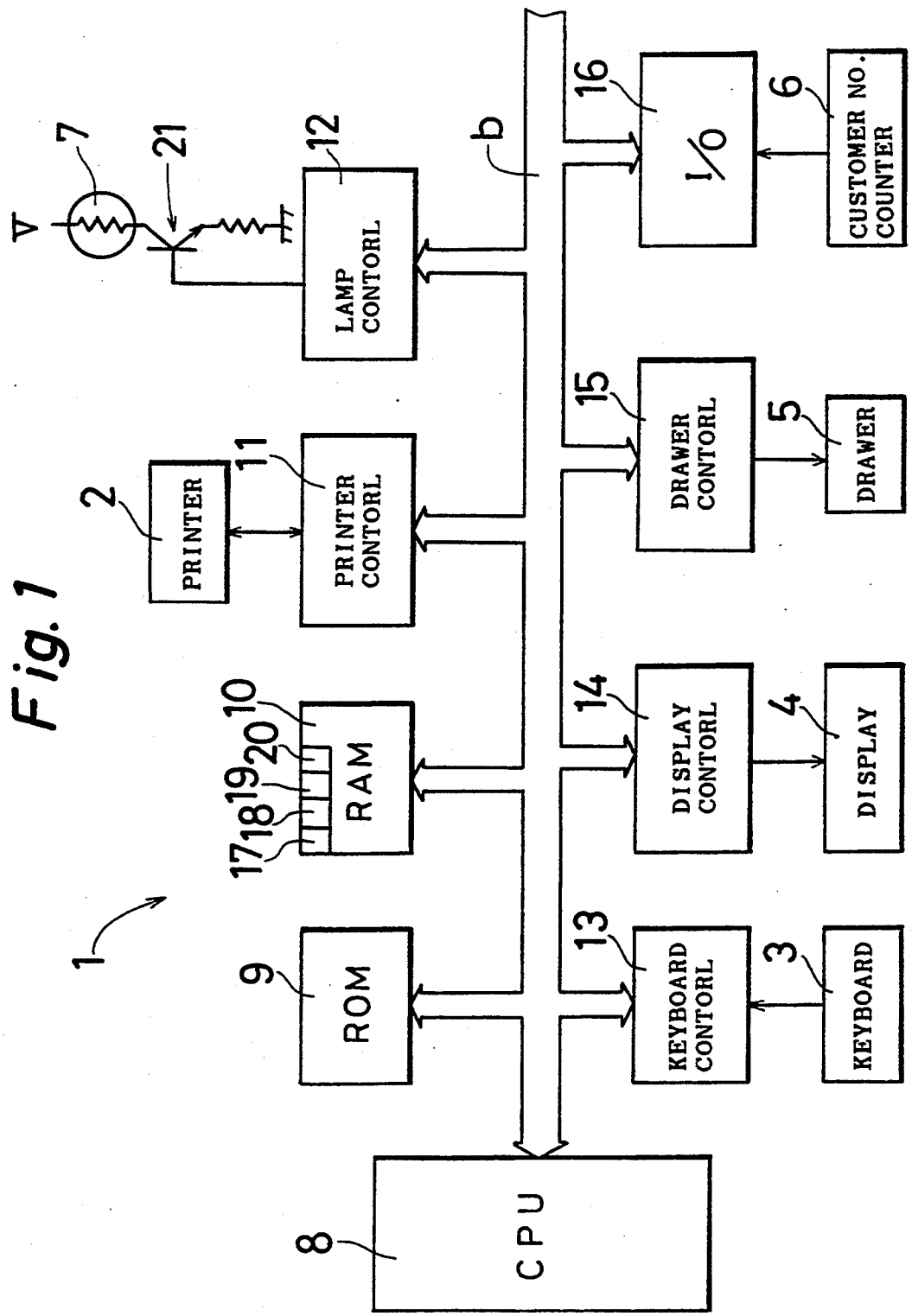
FIG. 1 is a block diagram showing an electric structure of an ECR 1.

Now referring to the drawing, preferred embodiments of the invention are described below.

FIG. 1 is a block diagram showing an electric structure of an ECR 1 according to a preferred embodiment of the invention. The ECR 1 comprises a central processing unit (hereinafter abbreviated as "CPU") 8. Connected to the CPU 8 through a data bus b are a read only memory (hereinafter abbreviated as "ROM") 9, a random access memory (hereinafter abbreviated as "RAM") 10, a printer control circuit 11, a lamp control circuit 12, a keyboard control circuit 13, a display control circuit 14, a drawer control circuit 15, an input/output (hereinafter abbreviated as "I/O") port 16 and so on.

A keyboard 3 comprises a plurality of keys. Through the keyboard control circuit 13, entry of instructions such as entry of sales information and programming of operation conditions of ECR 1 is performed. The ROM 9 stores therein a program for controlling various operations of the ECR 1. The program is retrieved by the CPU 8, and using a working area which is assigned in the RAN 10, registration and the like are performed by the CPU 8 based on the retrieved program. In the RAM 10, storage areas are ensured for memories 17, 18 and 19 and a total customer number memory 20 which are used in the present embodiment.

Of the memories 17, 18, 19 and 20, the memory 17 includes a 2-byte area, for instance, to set a predetermined customer number which will serves as a reference value for judging the crowdedness of the ECR 1. The memory 18 includes a 2-byte area, for example, to store the number of customers for one transaction entered through the keyboard 3.

The memory 19 includes a 4-byte area, for instance, to store the total number of customers who have passed the check out lane so far to the current time from the opening time of the store. This total number of the customers is read from a customer number counter 6. Further, the total customer number memory 20 includes a 4-byte area, for instance, to store the total number of customers who have had transaction with the ECR 1 so far to the current time from the opening time of the store. This total number of the customers is added up and stored every time the number of customers is stored in the memory 18 upon completion of one transaction.

A display unit 4 displays the sales information which was entered, information about the operations of the ECR 1 and etc., under the control of the display control circuit 14. A printer 2 prints out letters and figures to be printed on a receipt and a journal under the control of the printer control circuit 11. A drawer 5 contains cash and the like. The drawer 5 is opened and closed under the control of the drawer control circuit 15.

The customer number counter 6 detects incidence of light thereupon. The next time the customer number counter 6 detects incidence of light after the incident light was blocked by a customer passing in front of the customer number counter 6, the customer number counter 6 recognizes passage of one customer and increments by 1. In this manner, the customer number counter 6 counts up the number of customers who are waiting in front of the ECR 1 and transfers the information about the number of the waiting customers to the CPU 8 through the I/O port 16. A transistor 21, in response to a control signal which is received therein from the CPU 8 through the lamp control circuit 12, turns on and off. Hence, a voltage V is supplied and interrupted, thereby a lamp 7 being turned on and off, respectively.

Figure 2:
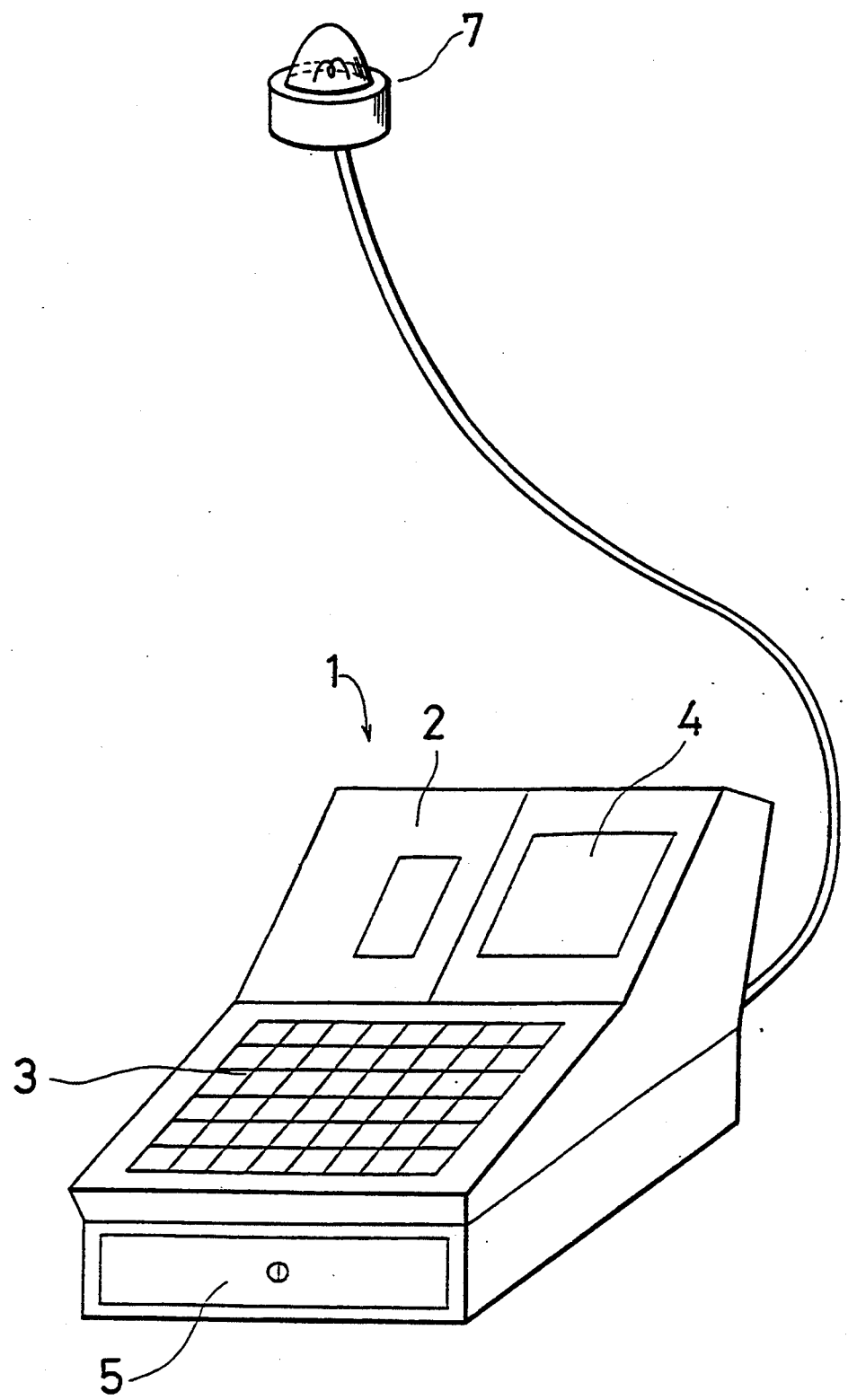
FIG. 2 is a perspective view of the ECR 1.

FIG. 2 is a perspective view of the ECR 1. The ECR 1 comprises the keyboard 3 for entering sales data such as the prices and the numbers of the goods, the display unit 4 for displaying the registered sales data, the operation conditions of the ECR 1 and the like, the printer 2 for printing the sales data and the like on a receipt and a journal, the drawer 5 for containing cash and the like, and the lamp 7 which is turned on and off to inform customers of the crowdedness of the ECR 1.

Figure 3:
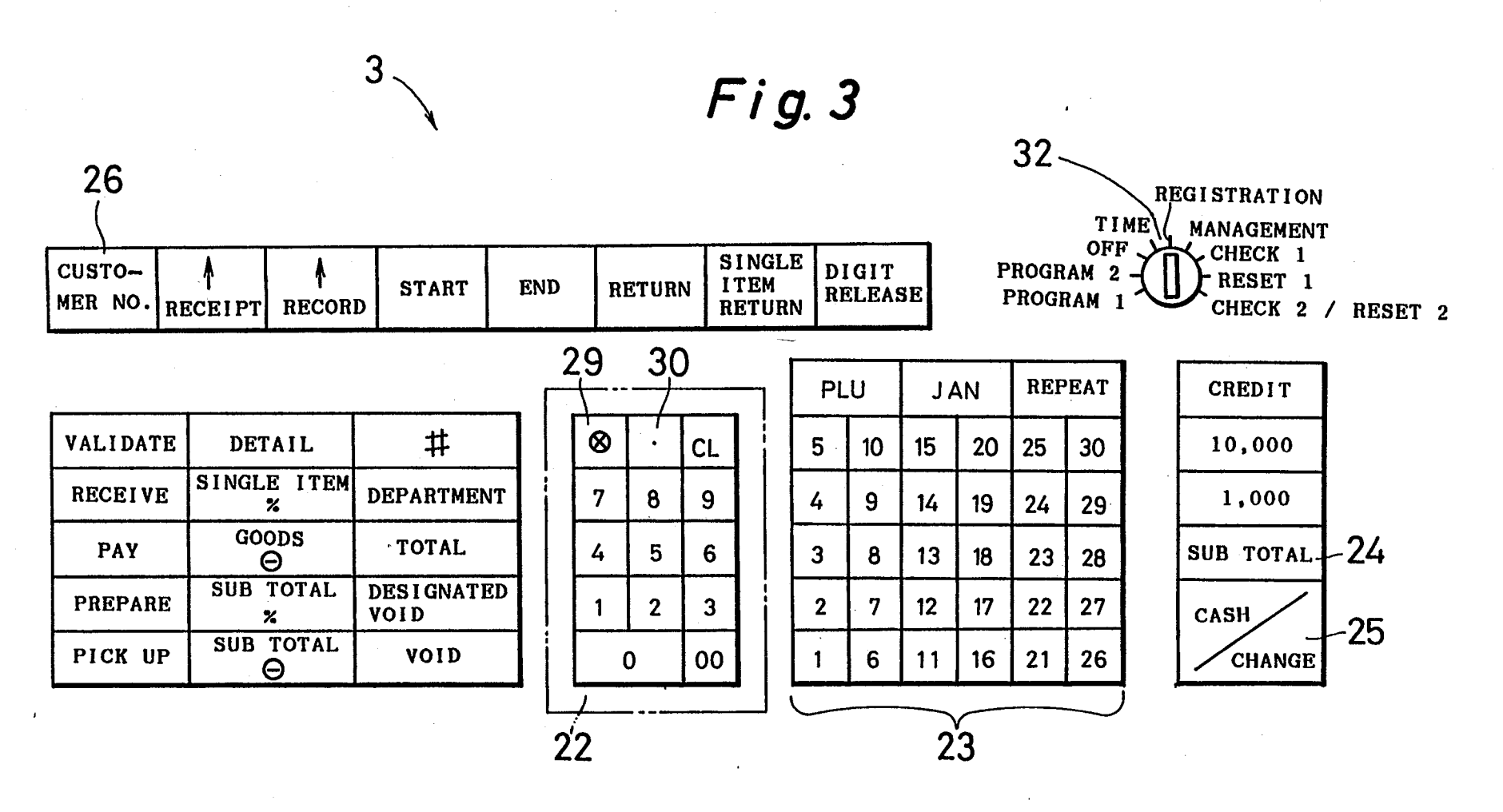

FIG. 3 is a plan view showing the arrangement of the keys of the keyboard 3 which is equipped to the ECR 1. On the keyboard 3, various keys are arranged such as: numeric keys 22 including a multiplication entry 29 for performing registration of an operation mode of the ECR 1 and a decimal entry key 30; department entry keys 23 for designating the department to which a good belongs; a sub total key 24 which is to be punched at finalization after registration and a cash key 25. In addition, a customer number entry key 26 is also disposed to register the number of customers for one transaction before performing registration of goods for the transaction.

Figure 4:
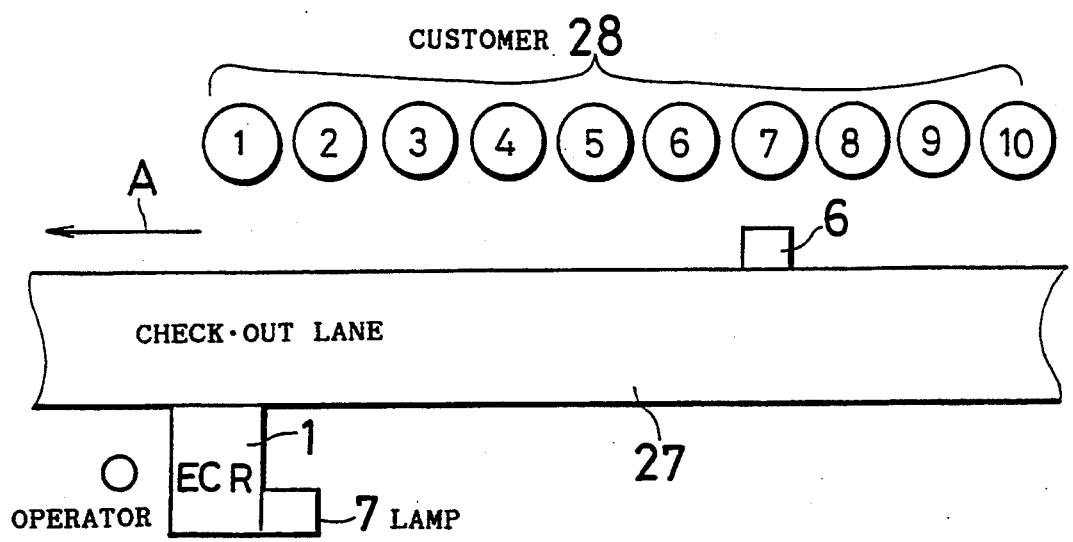
FIG. 4 is a view showing an example of arrangement according to an embodiment of the invention.

FIG. 4 is a view showing an example of the arrangement of the ECR 1. A check out lane 27 is disposed in the store. On the one side of the check out lane 27, the main body of the ECR 1 is disposed. The lamp 7 is located above the main body of the ECR 1, for instance. Further, on the other side of the check out lane 27, the customer number counter 6 is disposed for counting the number of the customers 28 who are waiting in a line along the check out lane 27. The customer represented in element 28 who finished payment will move in the direction of the arrow A so that registration procedure for the next customer represented in element 28 is started.

The main body of the ECR 1, the lamp 7 and the customer number counter 6 are connected to each other by a signal line. The lamp 7 and the customer number counter 6 are controllable by the CPU 8 which is mounted within the main body of the ECR 1. The memory 17 which is disposed within the RAM 10 of the main body of the ECR 1 includes a 2-byte area, for example, in which the reference customer number which serves as a reference for judging the crowdedness of the ECR 1 is set.

Figure 5:
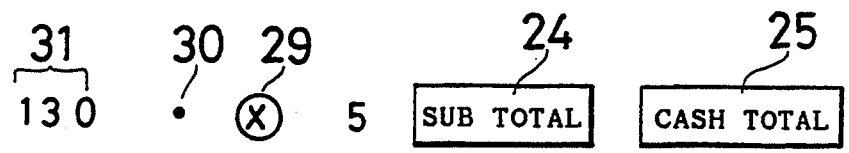
FIG. 5 is a view showing an example how a memory 17 disposed within a RAM 10 is programmed.

FIG. 5 is a view showing an example of programming to the memory 17. The procedure of the programming in the case where the reference customer number is "5," for example, is as follows. A function change switch 32 is set to "Program 1." Following this, a JOB code 31 which is used to set various modes is entered through the numeric keys 22. When entered in the memory 17, the JOB code 31 is inputted as "130," for example. Next, the decimal entry key 30 and the multiplication entry 29 are tapped in this order, and the key "5" i.e., the reference number of customers, is punched. The sub total key 24 is thereafter pushed, thereby the number "5" being registered. The cash key 25 is then punched to confirm the content which was programmed. The function change switch 32 is returned to "Registration" to complete the programming.

Figure 6:
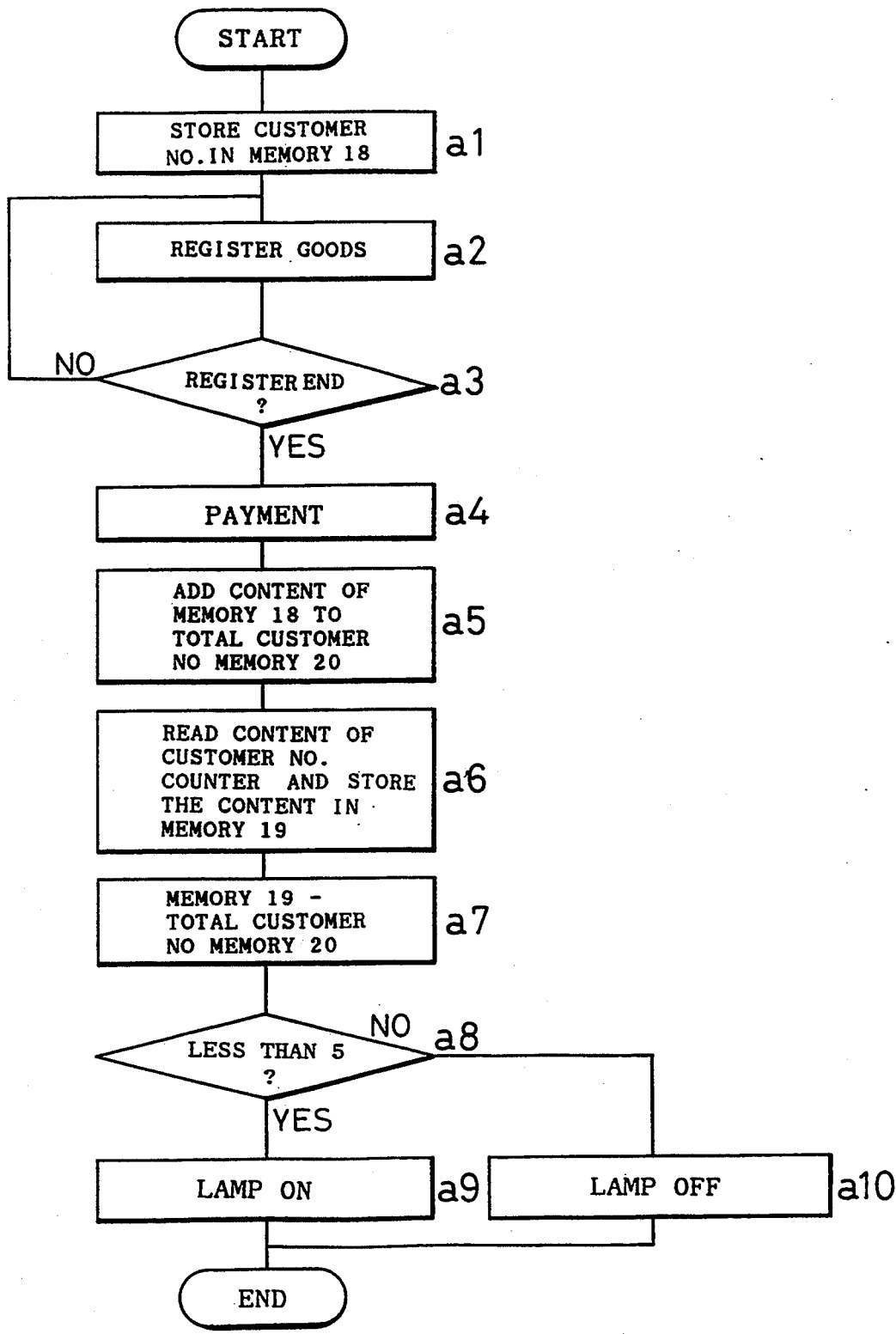
FIG. 6 is a flow chart for explaining operations of turning on and off a lamp 7 in the ECR 1.

FIG. 6 is a flow chart for explaining operations of the ECR 1. At a step a1, after an operator entered the number of customers for one transaction, for example "2" by using the numeric keys 22, the operator punches the number entry key 26 so that the CPU 8 stores "2" in the memory 18. Next, at a step a2, the operator performs registration of goods. At a step a3, the operator confirms whether the registration is complete and continues the registration of the goods at the step a2 until the registration is completed. Upon completion of the registration, payment is conducted at a step a4.

At a step a5, the CPU 8 adds the content "2" of the memory 18 and the content of the total customer number memory 20, for instance, "345" to "347." At a step a6, the CPU 8 reads the number of customers counted at the customer number counter 6, for example "349" and stores the same in the memory 19. At a step a7, the CPU 8 calculates a difference between the value "349" which is stored in the memory 19 and the value "347" which is stored in the total customer number memory 20.

At a step a8, the CPU 8 judges whether the difference is equal to or smaller than "5," the value which is set in the memory 17. If the difference is equal to or smaller than "5," the CPU 8 determines that the ECR 1 is not crowded and supplies a high level control signal to the transistor 21 through the lamp control circuit 12 at a step a9. As a result, the transistor 21 is activated and turns on the lamp 7.

If it is judged that the difference is equal to or larger than "5" at the step a8, the CPU 8 determines that the ECR 1 is crowded and sends a low level control signal to the transistor 21 through the lamp control circuit 12 at the step a9. As a result, the transistor 21 is not activated and turns off the lamp 7. In this case, "2" is the difference between the value "349" which is stored in the memory 19 and the value "347" which is stored in the total customer number memory 20. Since "2" is smaller than "5" which is set in the memory 17, it is judged that this ECR 1 is not crowded and the lamp 7 is turned on. This completes registration procedure for one transaction.

Thus, by turning the lamp 7 on and off as means for informing the crowdedness of the ECR 1, it is made possible for the customers represented in element 28 who are far from the ECR 1 to judge whether the ECR 1 is crowded, whereby transaction is performed smoothly. Alternatively, display means may be used on which the number of customers who are waiting for payment is directly displayed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic cash register, comprising:
    means for informing a predetermined information to customers who are waiting for transaction;
    means for detecting the number of customers who are waiting for transaction;
    and means for controlling to drive the informing means when the number of customers detected by the detecting means exceeds a predetermined standard value, the standard value being a positive integer greater than zero.

2. The electronic cash register as claimed in claim 1, wherein the informing means is a display apparatus.

3. The electronic cash register as claimed in claim 1, wherein the informing means is a lamp.

4. The electronic cash register as claimed in claim 1, wherein in order to drive the informing means, when the difference between the customers detected by the detecting means and a number of customers served by the cash register exceed the predetermined standard value.

5. The electronic cash register as claimed in claim 1, further including means for manually entering a number representing the number of customers being served at a transaction, the number being greater than zero.

6. An electronic cash register, comprising:
    means for informing a predetermined information to customers who are waiting for transaction;
    means for detecting the number of customers who are waiting for transaction the means for detecting including;
        a customer number counter for counting the number of customers who are waiting for transaction,
        a first memory for storing a count of the customer number counter,
        an entry key for registering the number of customers for each transaction,
        a second memory for storing a registered customer number which is registered by the entry key,
        means for calculating to accumulate counts of the second memory for every entry into the second memory by using the entry key, and
        a total customer number memory for storing an accumulated count which is calculated by the calculating means,
        and wherein the detecting means detects a difference between the count which is stored in the first memory and the count which is stored in the total customer number memory, and
    means for controlling to drive the informing means when the number of customers detected by the detecting means exceeds a predetermined standard value.

7. An electronic cash system, comprising:
    a plurality of electronic cash registers,
    means for informing a predetermined information to customers who are waiting for transaction;
    means for detecting the number of customers who are waiting for transaction at each one of the electronic cash registers;
    and means for controlling to drive the informing means when the number of customers detected by each detecting means exceeds a predetermined standard value the standard value being a positive integer greater than zero.

8. The electronic cash register as claimed in claim 7, wherein the informing means is a display apparatus.

9. The electronic cash register as claimed in claim 7, wherein the informing means is a lamp.

* * * * *